(12) United States Patent
Pollack et al.

(10) Patent No.: US 8,919,806 B2
(45) Date of Patent: Dec. 30, 2014

(54) FOLDABLE STROLLER AND FRAME ASSEMBLY

(71) Applicant: Graco Children's Products Inc., Atlanta, GA (US)

(72) Inventors: Thomas J. Pollack, Atlanta, GA (US); Louis Doucette, Acworth, GA (US); Thomas M. Perrin, Alpharetta, GA (US); William Forbes, Atlanta, GA (US); Alan W. Ball, Loveland, OH (US); Kelly Hon, Johns Creek, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/627,592

(22) Filed: Sep. 26, 2012

(65) Prior Publication Data

US 2013/0113189 A1 May 9, 2013

Related U.S. Application Data

(60) Provisional application No. 61/539,373, filed on Sep. 26, 2011.

(51) Int. Cl.
*B62B 7/08* (2006.01)
*B62B 9/00* (2006.01)
*B62B 7/06* (2006.01)

(52) U.S. Cl.
CPC ........... *B62B 7/066* (2013.01); *B62B 2205/003* (2013.01); *B62B 2205/26* (2013.01); *B62B 7/08* (2013.01)
USPC ............ 280/642; 280/644; 280/647; 280/650

(58) Field of Classification Search
USPC .......... 280/642, 644, 647, 649, 650, 657, 658
See application file for complete search history.

(56) References Cited

U.S. PATENT DOCUMENTS

| | | | | |
|---|---|---|---|---|
| 4,216,974 A | * | 8/1980 | Kassai | 280/42 |
| 4,412,689 A | * | 11/1983 | Lee | 280/648 |
| 4,567,964 A | * | 2/1986 | Kassai | 188/20 |
| 4,681,340 A | * | 7/1987 | Pasquini | 280/642 |
| 4,844,504 A | * | 7/1989 | Bigo | 280/642 |
| 5,388,852 A | * | 2/1995 | Bigo et al. | 280/642 |
| 5,516,142 A | * | 5/1996 | Hartan | 280/642 |
| 5,553,885 A | * | 9/1996 | Chang | 280/642 |
| 5,755,455 A | * | 5/1998 | Chen et al. | 280/642 |
| 5,938,230 A | * | 8/1999 | Huang et al. | 280/650 |
| 6,811,178 B2 | * | 11/2004 | Tomasi et al. | 280/650 |

(Continued)

*Primary Examiner* — J. Allen Shriver, II
*Assistant Examiner* — Travis Coolman
(74) *Attorney, Agent, or Firm* — Lempia Summerfield Katz LLC (57) ABSTRACT

A foldable stroller has a frame assembly with a fold joint, a fold joint, a handle push arm, a front leg with an upper end connected to the fold joint, a rear leg extending down from and pivotally connected to the fold joint, and a drive link. The drive link has a rear end pivotally coupled to the rear leg below the fold joint and a front end pivotally coupled to a lower end of the push arm. The frame assembly is reconfigurable between an unfolded and a folded configuration. In the folded configuration, the fold joint moves upward along the handle push arm. The rear end of the drive link and the rear leg are moved toward and lie closely adjacent the front leg and handle push arm. The frame assembly may automatically move to the folded and/or unfolded configuration. The foldable stroller may also stand upright in the folded configuration.

20 Claims, 10 Drawing Sheets

(56) References Cited

U.S. PATENT DOCUMENTS

| | | | |
|---|---|---|---|
| 6,837,503 B2 * | 1/2005 | Chen et al. | 280/87.021 |
| 7,396,038 B2 * | 7/2008 | Zweideck | 280/642 |
| D583,718 S * | 12/2008 | Zweideck | D12/129 |
| 7,523,954 B2 * | 4/2009 | Dotsey et al. | 280/642 |
| 7,562,895 B2 * | 7/2009 | Santamaria | 280/642 |
| 7,694,996 B2 * | 4/2010 | Saville et al. | 280/642 |
| 7,770,911 B2 * | 8/2010 | Dotsey et al. | 280/647 |
| 7,871,100 B2 * | 1/2011 | Chen et al. | 280/642 |
| 8,066,300 B2 * | 11/2011 | Ohnishi | 280/647 |
| 8,157,286 B2 * | 4/2012 | Lai | 280/647 |
| 8,210,562 B2 * | 7/2012 | Ohnishi | 280/642 |
| 8,465,045 B2 * | 6/2013 | Lai | 280/650 |
| 2005/0258619 A1 * | 11/2005 | Zweideck | 280/647 |
| 2007/0069504 A1 * | 3/2007 | Lan | 280/642 |
| 2007/0085302 A1 * | 4/2007 | You et al. | 280/642 |
| 2007/0296182 A1 * | 12/2007 | Saville et al. | 280/642 |
| 2009/0302577 A1 * | 12/2009 | Ageneau et al. | 280/642 |
| 2011/0218712 A1 * | 9/2011 | Thorne et al. | 701/49 |

* cited by examiner

FOLDABLE STROLLER AND FRAME ASSEMBLY

RELATED APPLICATION DATA

This patent is related to and claims priority benefit of U.S. provisional application Ser. No. 61/539,373 filed on Sep. 26, 2011 and entitled "Foldable Stroller." The entire content of this prior filed application is hereby incorporated herein by reference.

BACKGROUND

1. Field of the Disclosure

The present disclosure is generally directed to strollers, and more particularly to a foldable stroller and frame assembly for same that can fold up automatically or unfold automatically, fold up into a configuration having a thin, upright profile, fold up while remaining generally upright, stand up after being folded, and/or fold up and unfold automatically.

2. Description of Related Art

Most strollers and stroller frame assemblies fold up in some manner from an unfolded or in-use configuration to a more compact configuration. However, nearly every stroller folds from a standing configuration resting on its wheels to a folded configuration lying on the ground. The user must then bend over quite far in order to pick up the folded stroller from the ground before carrying the stroller to or placing the stroller in another location for storage, transport, or the like. This can be quite cumbersome and difficult, if not nearly impossible, when the caregiver is also holding a child in their arms. It can be difficult for some individuals to collect the folded stroller from the ground and then place it in an elevated storage location such as the trunk of a car, the back of a minivan, or the backseat of a car. This can be especially difficult while the person is holding a child in their arms.

The reverse is typically true when the caregiver wishes to erect or unfold a folded stroller frame. The user must first move the folded stroller and then place it on the ground. They then must release the storage latch, if any, that holds the frame assembly in the folded configuration. The user then has to lift or raise and unfold the stroller from the ground to the in-use or unfolded configuration. Thus, once the folded stroller frame is placed in a desired position on the ground, unfolding the frame assembly typically requires two steps including disengaging the storage latch and then raising and unfolding the frame assembly. This can also be extremely cumbersome and difficult for the caregiver, and even impossible while holding their child.

Few have attempted to solve these problems, and particularly in a 2-D stroller frame configuration. In a 2-D stroller, the frame assembly does not fold or collapse widthwise between the frame sides, but instead only folds up vertically and fore and aft or front to back. One particular stroller, the Origami stroller by the 4 Moms Company, attempts to solve or minimize the problems with folding and unfolding a stroller. The Origami stroller utilizes a motor to both fold and unfold the stroller. This allows the user to have their hands free while the frame automatically folds or unfolds. However, the user still needs to bend over to reach the stroller or place the stroller on the ground at some point while folding or unfolding the stroller. Also, the stroller is quite complex, not particularly lightweight, and relatively expensive because is requires a motor and battery in order to fold and unfold.

In addition, stroller frames that stand up when folded typically have a relatively large cube size, even after being folded. This can make carrying the folded stroller frame cumbersome and more difficult for the caregiver. It can also be more difficult for the caregiver to find a suitable location large enough to store the folded stroller. A number of manufacturers have produced strollers that, once folded downward to the ground, can be lifted up and then stored standing up. Such strollers are also typically relatively large, even when folded, in order to produce a stable foot pattern on which to stand. This is particularly true with 2-D stroller frames. These types of strollers are folded down to the ground, requiring the user to still bend down and retrieve the folded stroller.

Stroller manufacturers typically strive to produce a compact folded stroller configuration. This is often counter to also producing a stroller that can stand while being folded or even after the stroller frame is folded. The Metrolite stroller produced by Graco Children's Products Inc. (the assignee of the present invention) and the Cortina Stroller produced by Chicco are each configured to remain generally upright or standing during the fold sequence. The rear wheels on these strollers do not leave the ground during the fold sequence, and the front wheels rise up off the ground as the stroller is folded. The basket tube eventually touches the ground. The basket tube and the rear wheels combine to create a base to allow the stroller to stand immediately after being folded.

SUMMARY

In one example according to the teachings of the present invention, a foldable stroller has a frame assembly with left and right frame sides. Each frame side has a fold joint, a handle push arm slidably coupled to the fold joint, and a front leg arranged parallel to the handle push arm and having an upper end connected to the fold joint. Each frame side also has a rear leg extending down from and pivotally connected to the fold joint and a drive link with a rear end pivotally coupled to the rear leg below the fold joint and a front end pivotally coupled to a lower end of the push arm. The frame assembly is reconfigurable between an unfolded configuration and a folded configuration. In the folded configuration, the fold joint is slid upward along the handle push arm and the rear end of the drive link and the rear leg are moved toward and lie closely adjacent the front leg and handle push arm.

In one example, the handle push arms can slide upward and rearward relative to the respective front legs and fold joints to an extended position in the unfolded configuration.

In one example, the drive links can draw the rear legs and front legs toward and generally parallel to one another when the stroller frame assembly is moved to the folded configuration.

In one example, the foldable stroller can include a drive mechanism automatically biasing the frame assembly toward the folded configuration.

In one example, the foldable stroller can include a fold latch on each frame side. Each fold latch can be actuable from a latched condition retaining the frame assembly in the unfolded configuration to a released configuration whereby the drive mechanism automatically moves the frame assembly to the folded configuration.

In one example, the front ends of the drive links and lower ends of the handle push arms can move downward toward lower ends of the front legs when the frame assembly is moved to the folded configuration.

In one example, the handle push arms can slide parallel to the front legs when the frame assembly is moved to the folded configuration.

In one example, the rear legs can remain generally upright as the frame assembly is moved from the unfolded configuration to the folded configuration and the foldable stroller can stand upright in the folded configuration.

In one example, the foldable stroller can stand upright on front wheels positioned at lower ends of the front legs and on either the lower ends of the push arms, the front ends of the drive links, or contact surfaces defined thereat in the folded configuration.

In one example according to the teachings of the present invention, a foldable stroller has a frame assembly that is movable between a folded configuration and an unfolded configuration. The frame assembly has a fold joint and a fold latch actuable from a latched condition retaining the frame assembly in the unfolded configuration to a released condition. A plurality of frame components are coupled to the fold joint and include a drive link connected to at least two other of the plurality of frame components. A drive mechanism is operably coupled to the frame assembly and is configured and arranged to automatically fold the frame assembly from the unfolded configuration to the folded configuration when the fold latch is actuated to the released condition.

In one example, the drive mechanism can be connected to a pivot joint between the drive link and one of the frame components.

In one example, the drive mechanism can be connected to a pivot joint between a rear end of the drive link and a rear leg of the plurality of frame components.

In one example, the drive mechanism can have a pre-loaded resilient biasing element.

In one example, the drive mechanism can have a torsion spring.

In one example, the drive mechanism can have a torsion spring acting on a rear end of the drive link and a rear leg of the frame assembly.

In one example, the frame assembly can have left and right frame sides. Each frame side can have one of the fold joints, the plurality of the frame components including and one of the drive links, and one of the drive mechanisms.

In one example, the plurality of frame components can include a front leg and a handle push arm. A front end of the drive link can be pivotally connected to a lower end of the handle push arm. Each can move downward toward a lower end of the front leg when the frame assembly is moved to the folded configuration.

In one example, a handle push arm of the plurality of frame components can slide parallel to a front leg when the frame assembly is moved to the folded configuration.

In one example, the plurality of frame components can include a rear leg that is generally upright and extends down from the fold joint in the unfolded configuration and can remain generally upright as the frame assembly is moved to the folded configuration. The foldable stroller can stand upright in the folded configuration.

In one example, the plurality of frame components can include a handle push arm and a front leg that slide parallel to one another as the frame assembly is moved between the folded and unfolded configurations. The foldable stroller can stand upright on a front wheel assembly positioned at a lower end of the front leg and on either a lower end of the handle push arm, a front end of the drive link, or a contact surface defined thereat in the folded configuration.

In one example, the fold latch can include a latch pin extending perpendicular to and through one of the frame components and can have an exposed latching end. A hole can be formed through a shaft of the latch pin and a latch cable can extend along an interior of the one frame component and through the hole. The latch cable can have a free end fixed to the one frame component adjacent the latch pin. An adjacent frame component can have a latch opening therein. The latching end of the latch pin can extend into the latch opening in the latched position. A latch spring can be captured between an inner surface of the one frame component and the latch cable at the hole and can bias the latch pin to the latched position. Tension applied to the latch cable can compress the latch spring and move the latch pin to the released position with the latching end withdrawn from the latch opening.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed foldable strollers and frame assemblies solve or improve upon one or more of the above-identified and/or other problems and disadvantages with prior known foldable strollers. In one example, the disclosed foldable stroller has a frame assembly that can fold up into a relatively thin, compact configuration that is easy to lift, carry, and transport when not in use. In one example, the disclosed foldable stroller can fold up while remaining oriented in an upright orientation so that the user does not need to bend down and retrieve the folded stroller from the ground. In one example, the disclosed foldable stroller can stand upright after being folded. In one example, the disclosed foldable stroller can include a drive mechanism that automatically folds up the frame assembly upon release of a fold latch. In one example, the disclosed foldable stroller has a torsion spring on each frame side that automatically fold up the frame assembly to a folded configuration from an unfolded configuration upon release of a fold latch. In one example, the disclosed foldable stroller is relatively easy to fold up while remaining in an upright orientation so that the user does not need to bend over and retrieve the folded frame assembly from the ground after folding up. These and other objects, features, and advantages of the present invention will become apparent to those having ordinary skill in the art upon reading this disclosure.

Figure 1:
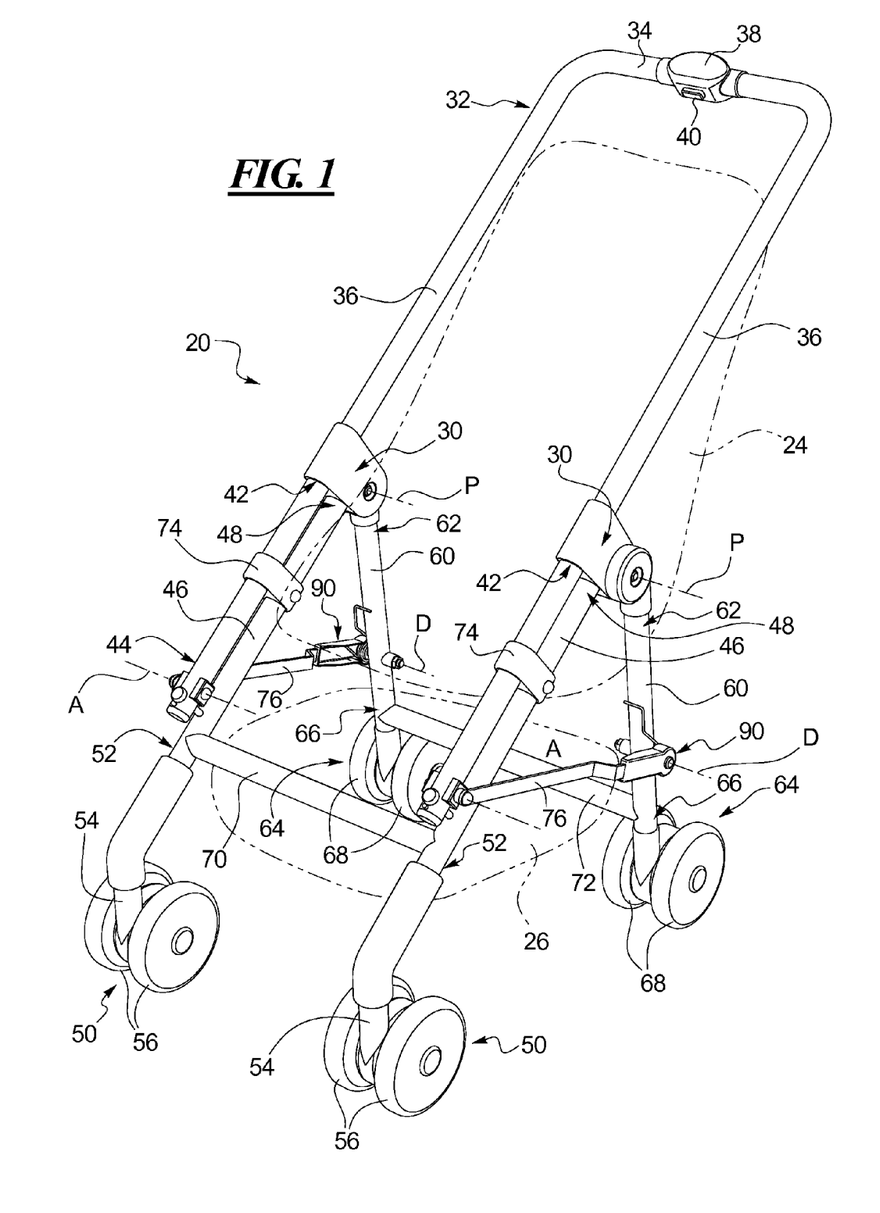
FIG. 1 shows a perspective front and side view of one example of a foldable stroller constructed in accordance with the teachings of the present invention.

Turning now to the drawings, FIG. 1 shows one example of a foldable stroller 20 constructed in accordance with the teachings of the present invention. In this example, the foldable stroller 20 generally has a frame assembly 22 and a seat 24 supported by the frame assembly. The foldable stroller can also have other known stroller features, such as an under-seat storage basket 26 and/or other such features including, but not shown, a canopy, a seat harness system, one or more cup holders, a child's tray, an arm bar, and the like. In this example, the seat assembly 24 and the storage basket 26 are shown in very simplified phantom form in order to better illustrate the construction of the frame assembly 22. As will be evident to those having ordinary skill in the art, the configuration and construction of the seat 24, storage basket 26, and other features provided on the stroller can vary considerably and yet fall within the spirit and scope of the present invention. These aspects of the foldable stroller 20 are not further described herein.

Figure 2:
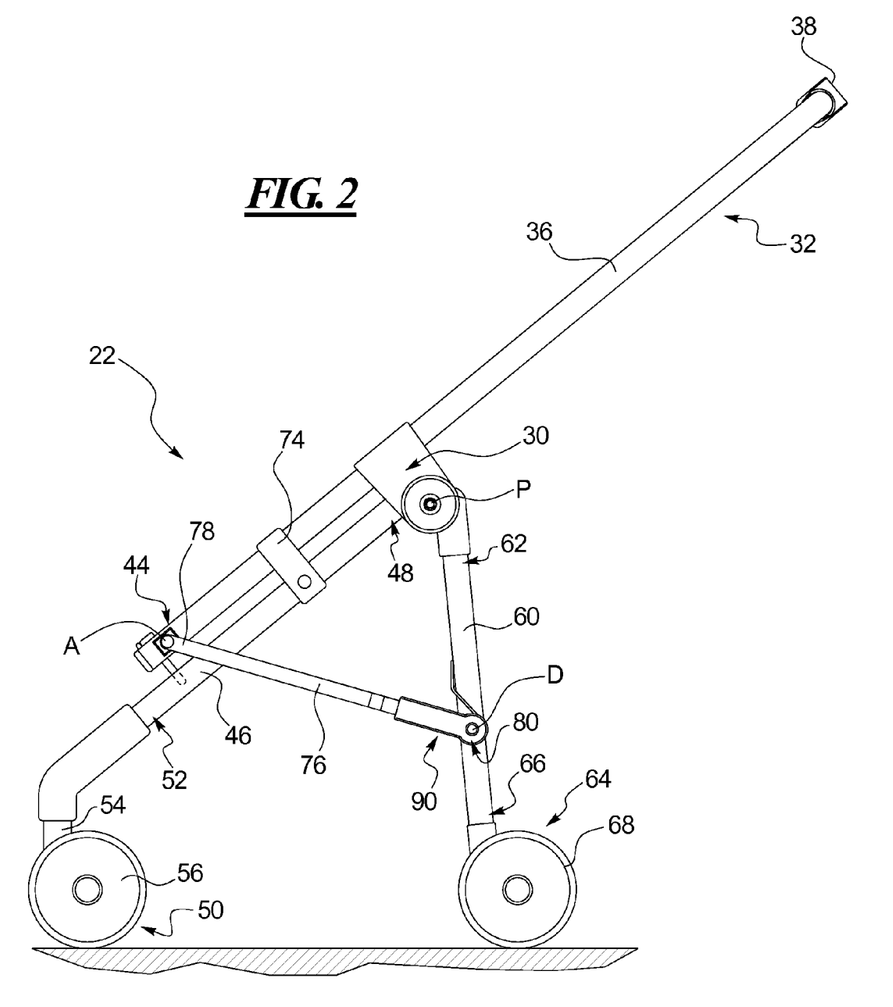
FIG. 2 shows a side view of the frame assembly for the foldable stroller shown in FIG. 1.

In the disclosed example, the foldable stroller 20 is constructed so that the frame assembly 22 can be reconfigured between an unfolded or in-use configuration as depicted in FIGS. 1 and 2 and a folded configuration (described in more detail below) for compact transport and storage when not in use. The frame assembly 22 has a plurality of frame components that together define the structure of the foldable stroller 20. The disclosed frame assembly 22 has left and right frame sides that are spaced laterally apart from one another across a width of the foldable stroller 20, as do most strollers of this type. In this example, the left and right frame sides are generally mirror images of one another. At times herein, only one of the frame sides, i.e., the right frame side, is described in detail and the various components of the right frame side may be referred to in the singular. However, it is to be understood that, when a right frame side component is referred to in the singular; the left frame side very likely includes the same mirror image component.

The disclosed frame assembly 22 has a fold joint 30 and in this example, each frame side has one of the fold joints. The plurality of frame components on each frame side are connected, coupled, or otherwise joined in some manner to the fold joint 30. The frame assembly 22 generally has a handle assembly 32 extending upward and rearward relative to the frame assembly structure and to the seat 24. The handle assembly 32 has a transverse or laterally extending handle bar 34 connected to upper ends of a pair of spaced apart, left and right handle push arms 36. Each of the push arms 36 is a tubular element and is generally linear or straight in this example. The handle bar 34 can be attached to the upper ends of the push arms 36 or the push arms and handle can be an integral bent or welded continuous structure. A fold actuator 38 is carried on a central portion of the handle bar 34 and has an actuator button 40 provided thereon.

In the disclosed example, the push arm 36 extends through a bore or opening 40 provided on the fold joint 30. The push arm 36 is thus slidably coupled to the fold joint 30 so that the two components can move or slide relative to one another. A lower end 44 of the push arm 36 extends downward and forward relative to the fold joint 30. The plurality of frame components also includes a front leg 46 that extends downward and forward from the fold joint 30. An upper end 48 of the front leg 46 is connected to the fold joint 30 in a fixed manner. In one example, the upper end 48 can seat in a blind bore provided in the fold joint and can be secured thereto with rivets, fasteners, or the like. A front wheel assembly 50 is attached to a lower end 52 of the front leg 46 and can include a swivel mechanism 54 and carry two front wheels 56 as is known in the art. In this example, the front leg 46 is also a tubular element and at least the majority of the length of the front leg including the upper end is linear or straight to match the push arm 36.

The plurality of frame components also includes a rear leg 60 that has an upper end 62, which is pivotally connected to the fold joint 30 at a pivot axis or fold pivot P. The rear leg 60 extends generally downward from the fold joint 30. In the disclosed example, the rear leg 60 is pivotally connected to the fold joint 30, the push arm 36 is slidably coupled to the fold joint, and the front leg 46 is fixedly connected to the fold joint. Thus, at least these frame components can be described as being coupled in some way to the fold joint, though each is coupled to the fold joint in a different manner.

A rear wheel assembly 64 is connected to a lower end 66 of the rear leg 60 and carries a pair of rear wheels 66. One or both of the front wheel assembly 50 or the rear wheel assembly 64 can include only one wheel 56 or 66, respectively, have a dual-wheel construction as shown herein, or other have an alternate construction. The configuration and construction of both the front and rear wheel assemblies can vary considerably within the spirit and scope of the present invention.

As best illustrated in FIG. 1, the frame assembly 22 has a front cross-member 70 that extends laterally between and interconnects the front legs 46 of the left and right frame sides. The front cross-member 70 is located generally between the upper end 48 and lower end 52 on the front leg 46. Likewise, the frame assembly 22 also has a rear cross-member 72 that extends laterally between and interconnects the rear legs 60. The rear cross-member 72 is also located generally between the upper end 62 and the lower end 66 on the rear legs 60. The frame assembly 22 can include additional structural elements, other than the handle bar 34, the front cross-member 70, and the rear cross-member 72, to help connect the left and right frame sides and to maintain the integrity and rigidity of the frame assembly structure during use.

In the disclosed example, the push arm 36 and the front leg 46 are arranged generally parallel to one another. In addition, the push arm 36 is arranged vertically over the front leg 46 in this example. This configuration can help reduce the overall width of the frame assembly 22. However, it is possible that the push arm 36 and front leg 46 be placed side to side relative to one another (or front leg over push arm) while the frame assembly 22 still functions as intended and is described herein. As shown in FIGS. 1 and 2, a slide collar 74 is connected to both the push arm 36 and the front leg 46. The slide collar 74 has two openings, one for receiving the front leg 46 and one for receiving the push arm 36. In this example, the slide collar 74 is affixed by a fastener, rivet, pin, or the like to the front leg 46, leaving the push arm 36 free to slide relative to the slide collar 74, similar to the fold joint 30. The slide collar 74 can help maintain the positional relationship and proper alignment between the front leg 46 and the push arm 36.

The plurality of frame components also includes a drive link 76 that has a front end 78 and the rear end 80. The drive link 76 is connected to at least two other of the plurality of frame components and helps impart movement of one of the frame components to other of the frame components when the frame assembly 22 and foldable stroller 20 are folded or unfolded. In this example, the rear end 80 of the drive link 76 is pivotally connected to the rear leg 60 at a pivot axis D below the fold joint 30 and above the rear cross-member 72. The front end 78 is pivotally connected to the lower end 44 of the push arm 36 at a pivot axis A. The drive link 76 in this example is a generally flat bar with holes in either end connected to the pivot axes D and A.

Each of the frame components described herein can vary in configuration and construction. The drive link 76 can be a hollow tubular structure, similar to the other frame components. Likewise, any one or more of the push arm 36, handle bar 34, front leg 46, and rear leg 60 can be a solid tube, a flat bar, or the like. The materials and manufacturing processes utilized to construct the various frame components can also vary within the spirit and scope of the present invention. Steel, aluminum, composite materials, sturdy and durable non-metallic materials, and the like can be used to form any one or more of the frame assembly components disclosed and described herein.

Figure 3:
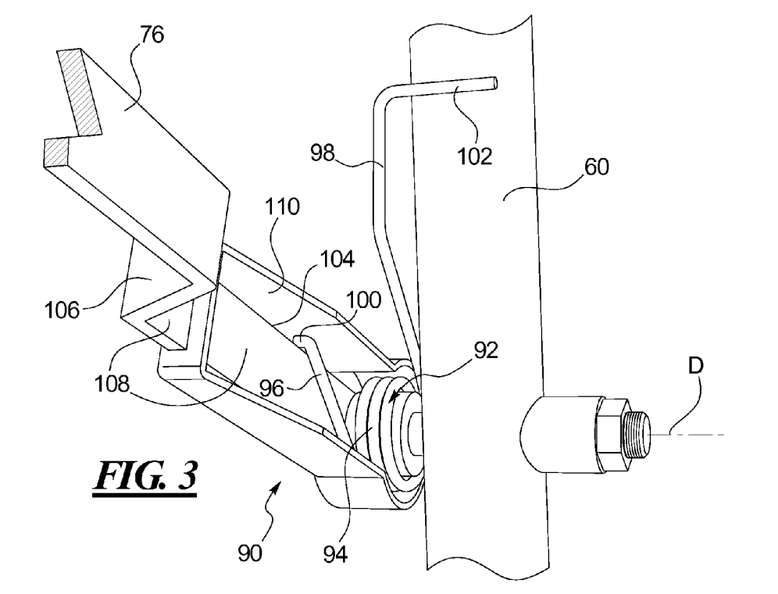
FIG. 3 shows a close-up inside perspective view of one example of a drive mechanism or biasing mechanism that can be used on the foldable stroller and frame assembly shown in FIGS. 1 and 2.

With reference to FIG. 3, the foldable stroller 20 in this example has a drive mechanism 90. The drive mechanism 90 is a purely mechanical device utilizing a biasing element to assist in moving the frame assembly 22 between the folded and unfolded configurations. In one example, a drive mechanism could be provided that automatically unfolds the frame assembly 22 from the folded configuration. Such a stroller might require a storage latch that would retain the frame assembly in the folded configuration. Once the storage latch is released, such a drive mechanism could then automatically bias the frame components from the folded configuration to the unfolded configuration. In another example, a drive mechanism or multiple drive mechanisms could be provided that automatically fold and automatically unfold the frame assembly 22. Such a mechanism or mechanisms could have a mechanical switch, clutch, clocking device, or override device that allows the desired direction of bias to override the undesired direction of bias, depending on whether the stroller is being folded or unfolded.

In the disclosed example, the drive mechanism 90 is configured to bias the frame assembly 22 to the folded configuration. The biasing element of the drive mechanism 90 can include any suitable type of mechanical spring, elastic cord, or the like that applies force to the frame components in the desired direction. The type of mechanical spring, if utilized, can also vary and could include a compression spring, a coil spring, a leaf spring, or the like. The drive mechanism 90 in this example utilizes a torsion spring 92 coupled to two of the frame components that are pivotally connected to one another. As shown in FIGS. 1 and 3, the torsion spring 92 has a main coil 94 wrapped around or concentric with a shaft S of the pivot axis D. The torsion spring 92 has a first leg 96 extending radially outward from the main coil 94 and a second leg 98 and also extending radially outward from the main coil, but in a different direction than the first leg. The first leg 96 has a bent end or hook 100 that hooks on or bears against the drive link 76. The second leg 98 also has a bent and or hook 102 that hooks on or bears against the rear leg 60.

The torsion spring structure 92 is shown in this example in simplified form. In a more complex form, the hook 100 can be secured through an opening or receptacle provided on the drive link 76 or can be secured to the drive link utilizing a fastener, rivet, pin, or the like. Likewise, the hook 102 can be secured through an opening or receptacle provided on the rear leg 60 or can be secured to the rear leg also utilizing a fastener, rivet, pin, or the like. Alternatively, the torsion spring 92 and/or one or both of the first and second legs 96, 98 can be housed either in an interior of a separate housing, a part of the rear leg, a part of the drive link, or the like. The legs 96, 98 of the torsion spring 92 could then act on interior surfaces of these components and yet function as intended. In these more complex forms, the components of the spring would not be exposed.

The hook 100 of the first leg 96 on the torsion spring 92 is borne against a top edge 104 of the drive link 76 in this example. The hook 102 of the second leg 98 is borne against a front facing side of the rear leg 60. The torsion spring 92 is configured so that the first and second legs 96, 98 are compressed toward one another when installed, resulting in the first and second legs 96, 98 being circumferentially biased away from one another. Thus, the torsion spring 92 is biased in a direction that would open up or increase the angle between the drive link 76 and the rear leg 60 on the frame assembly 22.

A bend 106 is formed near the rear end 80 of the drive link 76. This produces an outward stepped segment 108 on the drive link 76 near the rear end, creating clearance for the drive mechanism, and in this example the torsion spring 92. A relatively simple cover 110 is configured to snap over the stepped segment 108 and cover a majority of the torsion spring 92 including the main coil 94 and the first leg 96. The cover 110 could be configured to also cover the second leg 98 if desired. The cover 110 can be constructed to snap onto the drive link 76, the rear legs 60, or both.

Figure 4:
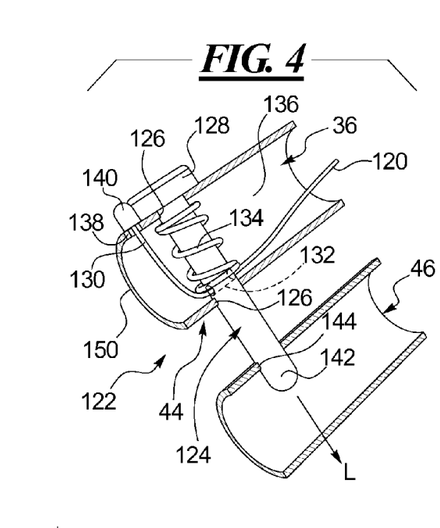
FIG. 4 shows a cross section taken along line IV-IV in FIG. 1 of a fold latch for the foldable stroller and in a latched or locked condition.
Figure 5:
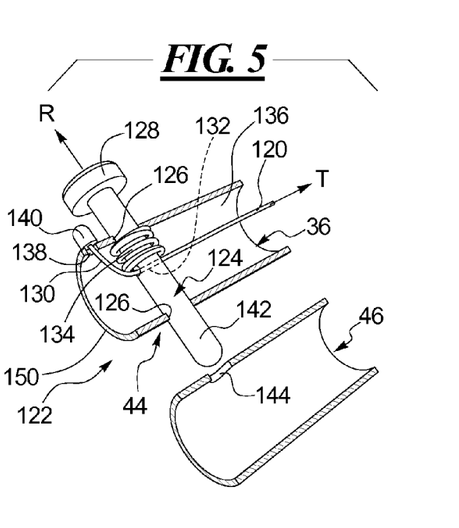
FIG. 5 shows the fold latch of FIG. 4 in a released or unlocked condition.

With reference to FIGS. 1, 4, and 5, the button 40 on the actuator 38 is configured to be depressed inward into the handle bar 34. When actuated in this manner, the actuator pulls on a cable 120 routed through the handle bar 34 and the push arm 36. The cable is routed and connected to a fold latch 122. In this example, the fold latch 122 is provided at the lower end 44 of the push arm 36. One example of a suitable fold latch 122 is shown in FIGS. 4 and 5. FIG. 4 shows the fold latch 122 in a latched position and FIG. 5 shows the fold latch in a released position.

The fold latch 122 has a latch pin 124 that extends across and perpendicular to the lower end 44 of the push arm 36 through openings 126 in the push arm. A head 128 on the latch pin 124 acts as a stop against the push arm 36 for the latch pin 124 in the latched position. A free end 130 of the cable 120 passes through a hole 132 across the latch pin 124 from the upper side to the lower side of the latch pin. A latch spring 134 is positioned on the latch pin 124 and is captured between an inner surface 136 of the push arm 36 and the cable 120 passing through the hole 132. The free end 130 of the cable 120 is threaded through a small opening 138 through the push arm 36 on the same side of the push arm adjacent the head 128. A slug 140 on the free end 130 fixes the free end 130 to the push arm.

In the latched position, a latching end 142 of the latch pin 124 seats in a latch opening 144 in the adjacent front leg 46, as shown in FIG. 4. The latch spring 134 biases the latch pin 124 to the latched position in the direction of the arrow L. Slack in the cable 120 in this latched position allows the cable to extend laterally or perpendicular across the push arm from the small opening 138 and then to curve around the spring 134 to a direction parallel with the push arm. When the button 40 on the actuator 38 is depressed, the cable 120 is pulled upward toward the actuator. This applies tension to the cable 120, but the free end 130 is fixed to the push arm 36 and cannot move. Thus, as the cable 120 is drawn taught, the cable compresses the latch spring 134 as shown in FIG. 5. Because the cable is routed through the hole 132 in the latch pin 128, the cable moves the latch pin in the direction of the arrow R against the spring bias to a released position. The latching end 142 is freed or disengaged from the latch opening 144 in this position.

Figure 6:
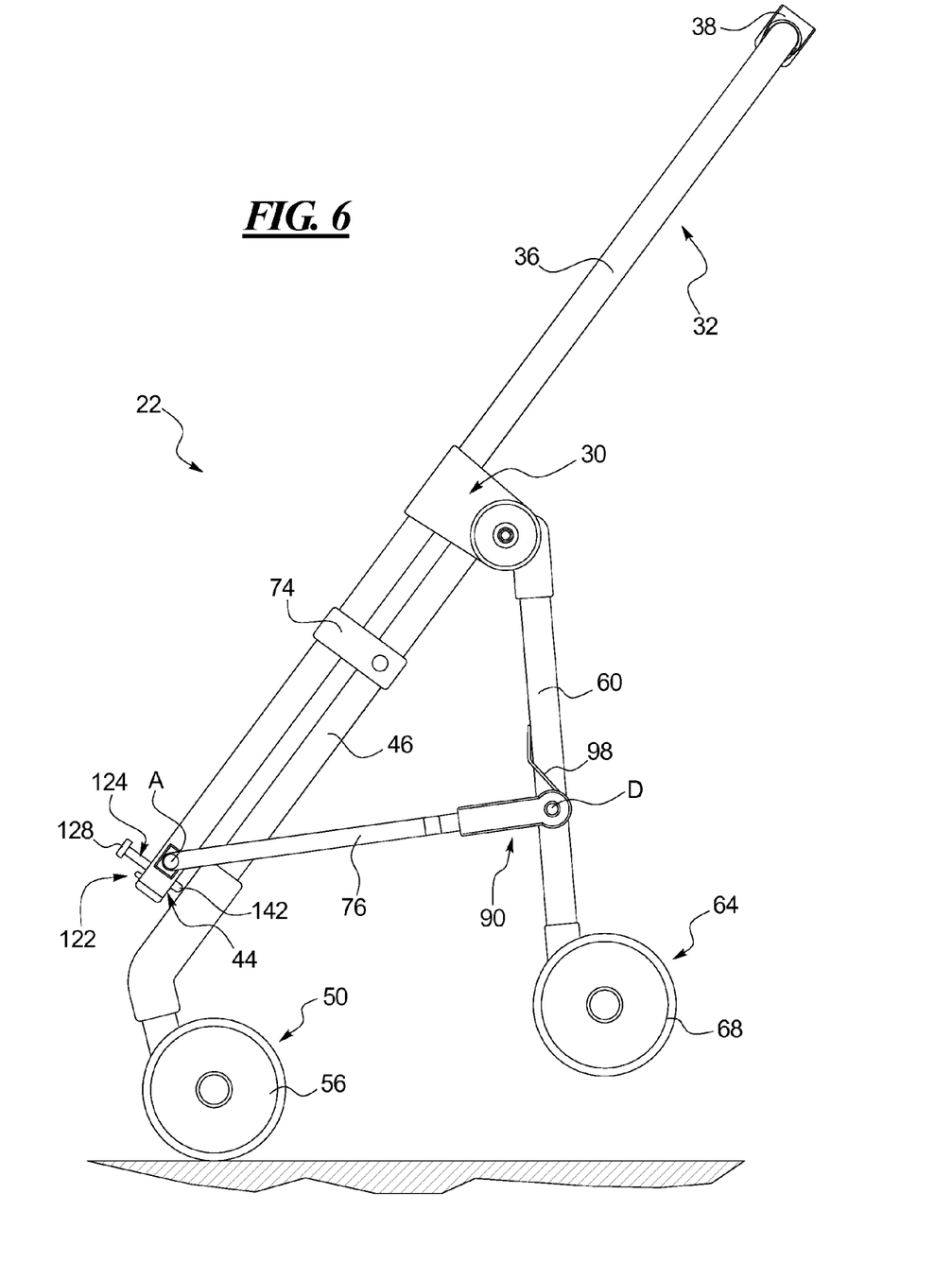
FIG. 6 shows a side view of the frame assembly of FIGS. 1 and 2 starting to fold up from the unfolded or in-use configuration of FIG. 1.

With a foldable stroller 20 in the unfolded or in-use configuration shown in FIGS. 1 and 2, the fold latch 122 is in the latched position shown in FIG. 4. The latch pin 124 is seated in the latch opening 144, which locks the push arm 36 in position relative to the front leg 46. The foldable stroller 20 can be used in a normal manner in this configuration. In order to unfold the foldable stroller, the user can actuate the push button 40 on the actuator 38 as described above. This moves the latch pin 124 to the released position as shown in FIG. 5 so that the foldable stroller 20 can move from the unfolded configuration to a folded configuration. With the fold latch 122 in the released position, the user can raise the rear end and rear wheels 68 of the foldable stroller 20 off the ground and onto only the front wheels 56. The first leg 96 of the torsion spring 92 will push downward on the drive link 76 and the second leg 98 will push upward and rearward on the rear leg 60. This causes the drive link 76 and rear leg 60 to pivot relative to one another, drawing the pivot axis D and rear leg forward toward the front leg 46 as depicted in FIG. 6.

Figure 7:
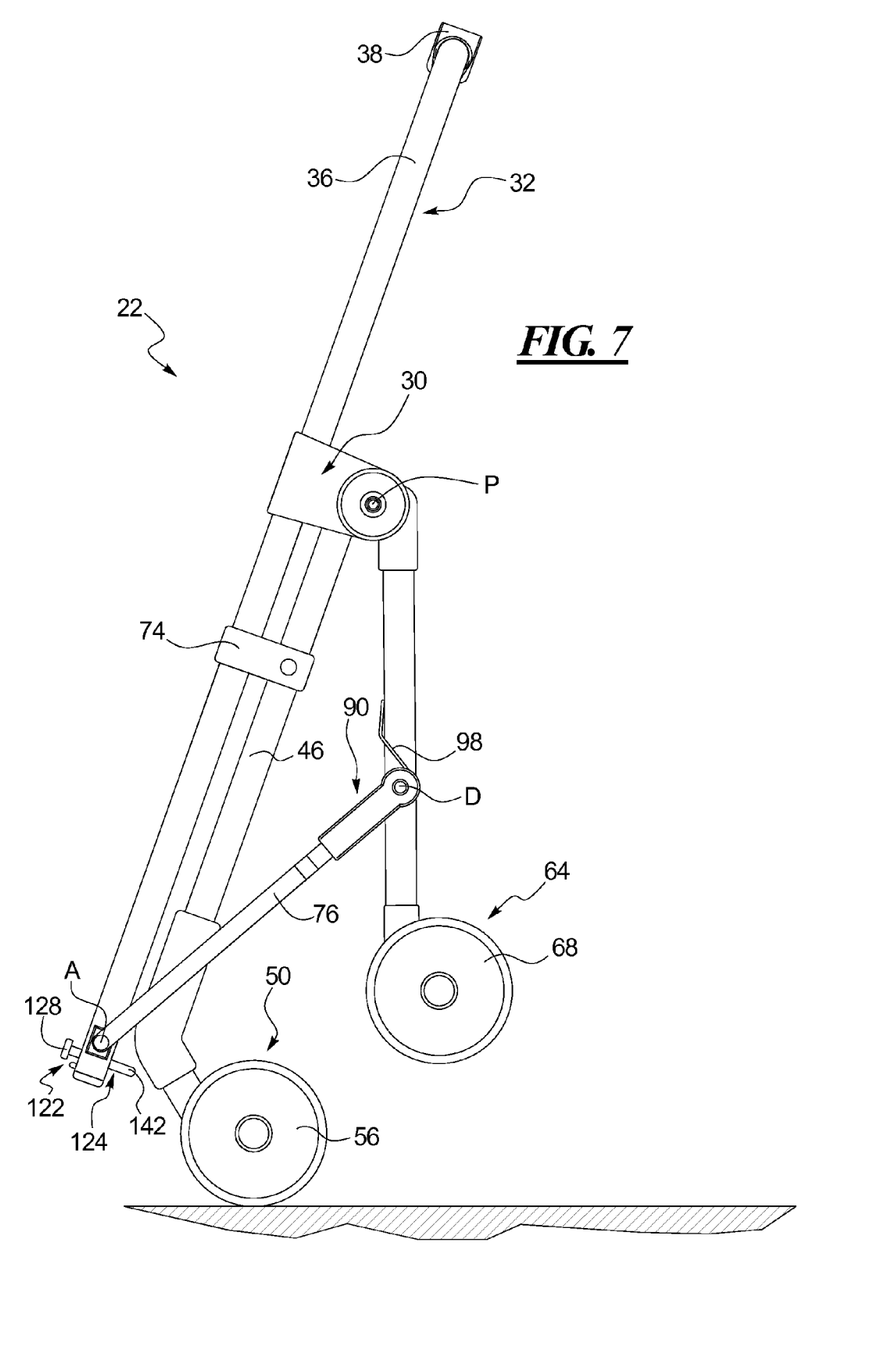
FIG. 7 shows the frame assembly of FIG. 6 and folded further from the unfolded or in-use configuration.
Figure 8:
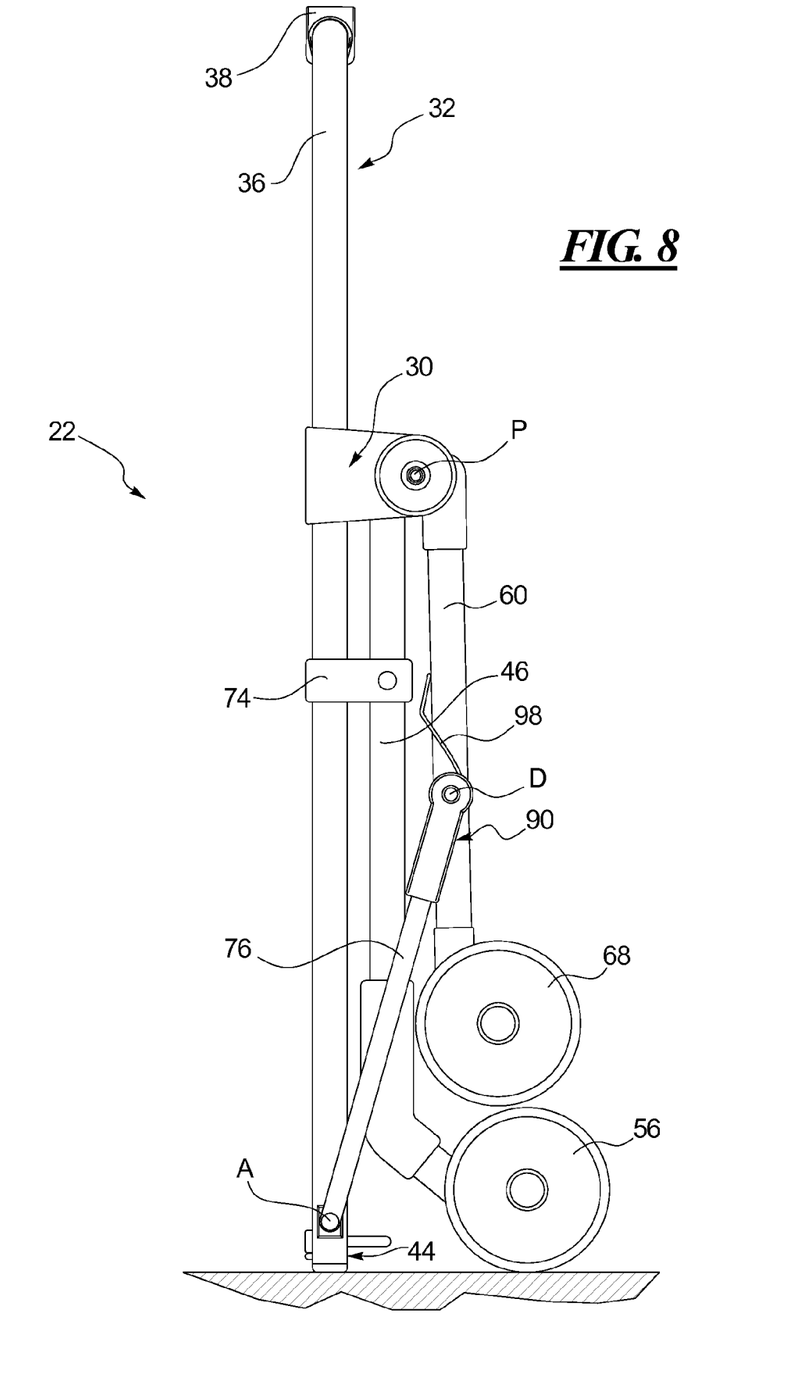
FIG. 8 shows the frame assembly of FIG. 7 in a completely folded configuration and standing up on end.
Figure 9:
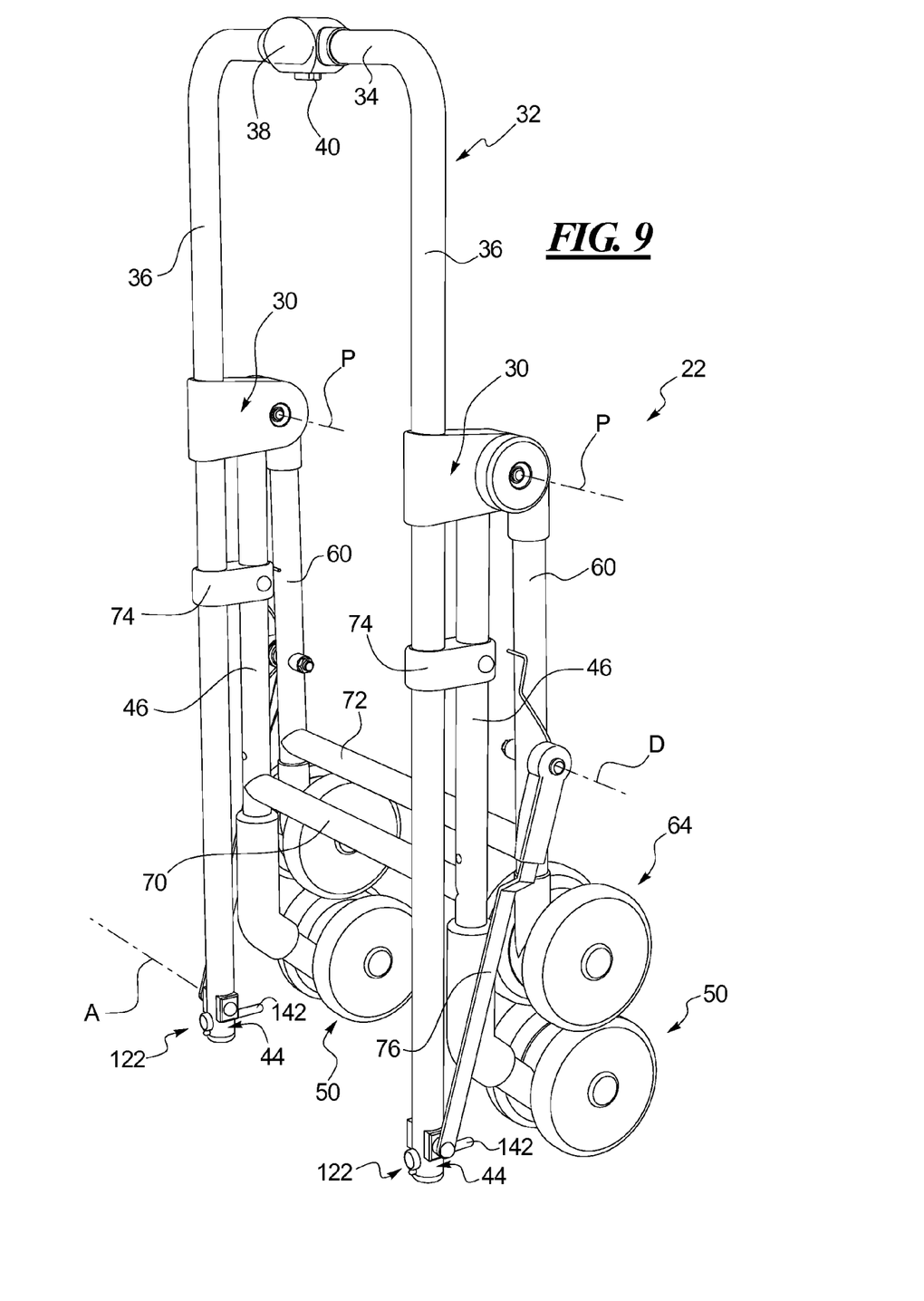
FIG. 9 shows a front perspective view of the completely folded and standing up frame assembly of FIG. 7.

The fold joint 30 and slide collar are both fixed to the front leg 46. As a result, the front end 78 of the drive link 76 pulls the push arm 36 downward, sliding the push arm parallel relative to both the fold joint 30 and the slide collar 74. This moves the pivot axis D closer to the front leg 46, as depicted in FIG. 7. The foldable stroller 20 reaches the completely folded configuration, as depicted in FIGS. 8 and 9, when the rear wheels 68, or part of the rear wheel assembly 64 or other frame component, contacts the front leg 46. In this folded configuration, the rear leg 60 is oriented generally parallel to the front leg 46. The gap between the front leg 46 and the rear leg 60 is defined by the position of the fold or pivot axis P and any radial offset of the upper ends 48, 62, of the front and rear legs, respectively, relative to the axis. Likewise, the push arm 36 is and remains parallel to the front leg 46 as its slides downward relative to the front leg during folding. In the completely folded configuration, the drive link 76 lies completely within the depth (front to back cube space) of the folded structure because it is pivotally connected to the push arm 36 and the rear leg 60. The disclosed structure of the frame assembly 22 can thus achieve a very compact folded configuration. All of the frame components generally lie parallel to one another when folded or lie within the cube space defined by the folded frame components when folded.

The foldable stroller 20 can also remain generally upright during folding and can stand upright when completely folded. When the user tilts the foldable stroller 20 onto the front wheels 56 and releases the fold latch 122, the frame assembly 22 automatically folds, driven by the drive mechanism 90. As the frame folds, the user can continue to tip the frame assembly 22 forward until it is generally vertical relative to the ground surface. When the frame assembly 22 is completely folded, as depicted in FIGS. 8 and 9, exposed surfaces 150 on the lower ends 44 of the push arms 36 are arranged to lie generally parallel with the front wheels 56. The foldable stroller 20 can therefore stand up generally upright, resting on the front wheels 56 and the exposed surfaces 150.

The foldable stroller 20 can be conveniently stored or stowed while standing upright in the folded configuration. The foldable stroller 20 can also be easily folded and then picked up and transported without the user having to bend over because the frame assembly 22 remains generally upright during folding. The cube space of the foldable stroller 20 in the folded configuration is also very compact. The folded stroller is thus not very cumbersome to lift and carry and can be stored in relatively narrow or small spaces. The foldable stroller 20 also is very easy to fold because all the user has to do is release the fold latch 122 and then the drive mechanism 90 does the rest.

Figure 10:
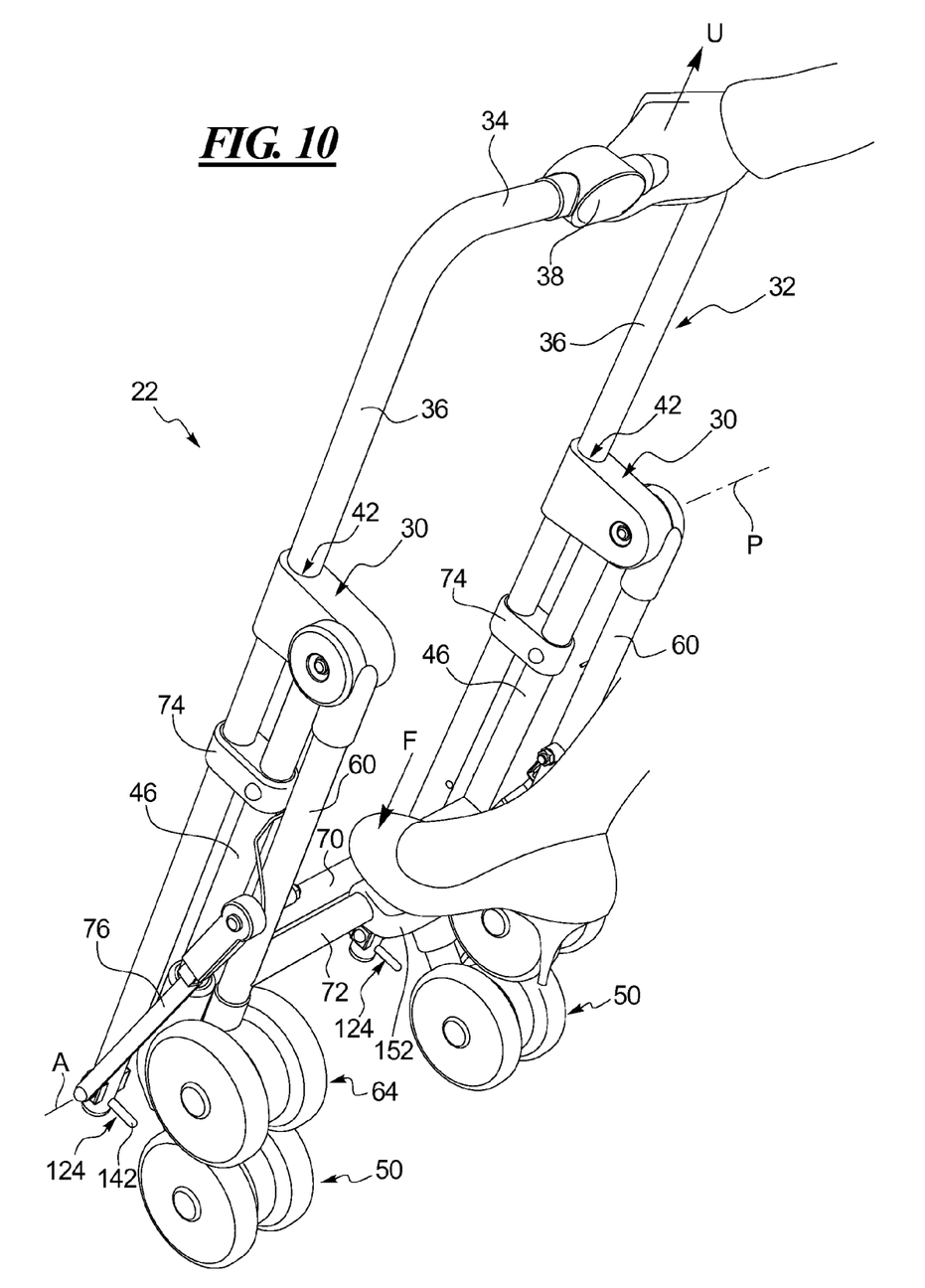
FIG. 10 shows a rear perspective view of the frame assembly in the folded configuration of FIGS. 8 and 9 and with a user ready to begin unfolding the frame assembly.

In the disclosed example, the foldable stroller 20 does not automatically unfold. The biasing force of the torsion springs 92 will retain the foldable stroller 20 in the folded configuration. When the user wishes to unfold the stroller to the unfolded configuration of FIGS. 1 and 2, the user can do so relatively easily. As shown in FIG. 10, the user can grasp the handle bar 34 and tilt the folded stroller 20 rearward and toward them. The rear cross-member 72 can be provided with an optional footpad or foot rest 152 to give the user a target for foot placement on the cross-member.

Figure 11:
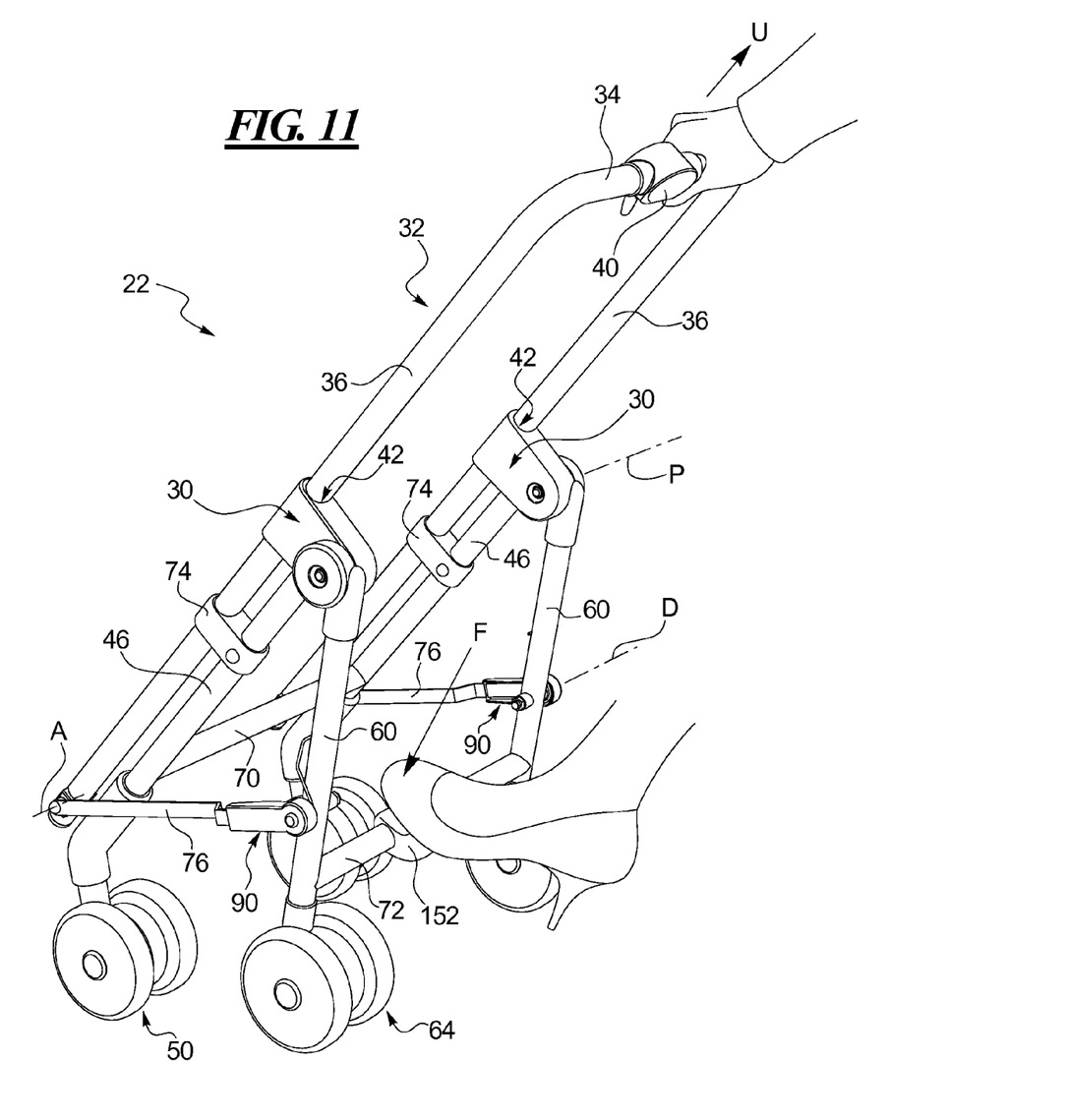
FIG. 11 shows the frame assembly of FIG. 10 but partly unfolded by the user.
Figure 12:
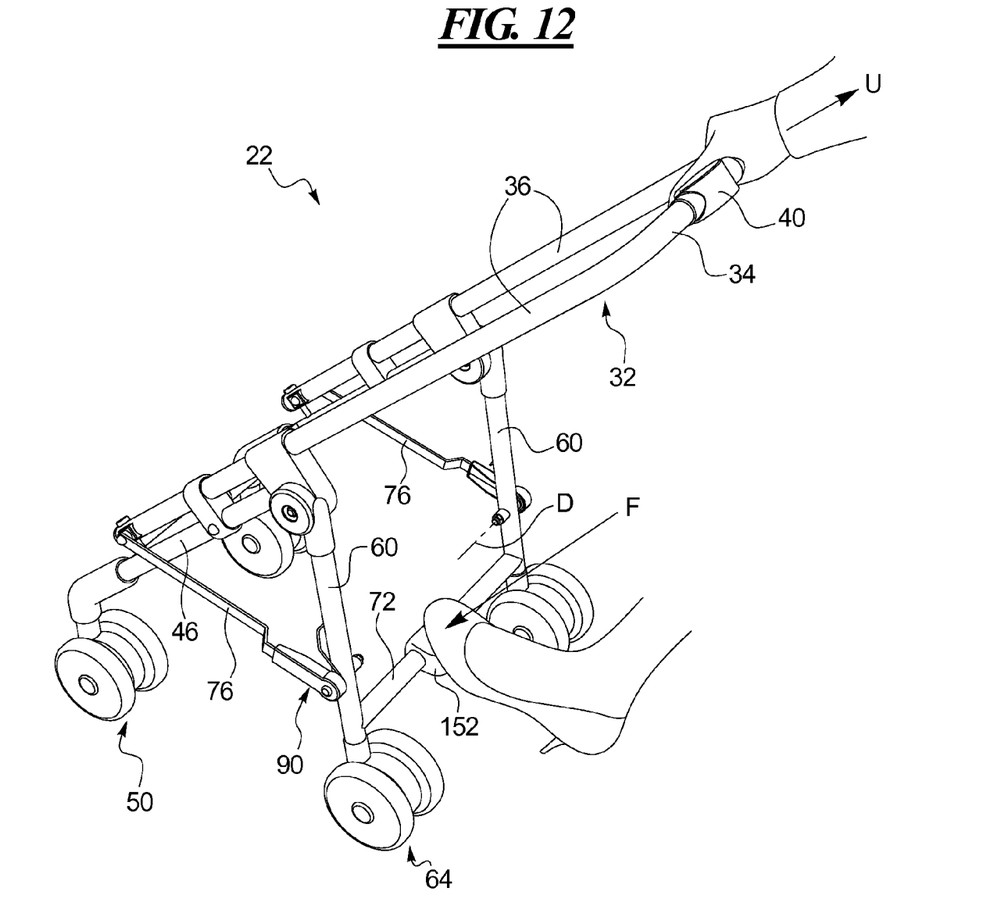
FIG. 12 shows the frame assembly in FIG. 11 but completely unfolded by the user.

To unfold the stroller, the user can grasp and pull up on the handle bar 34 in the direction of the arrow U and simultaneously push down on the foot rest 150 on the rear cross-member 72 in the direction of the arrow F. These opposing forces will slide or extend the push arm 36 parallel to the front leg and upward and toward the user relative to the fold joint 30 and the slide collar 74. This motion draws the front end 78 of the drive link 76 upward toward or in the direction of the fold joint 30, as depicted in FIG. 11. As the frame components move, the angle between the rear leg 60 and the rear end 80 of the drive link 76 about the pivot axis D begins to close against the bias force of the drive mechanism 90. This again loads the drive mechanism 90 for the next time the user wants to fold up the stroller 20. When the frame assembly 22 reaches the unfolded configuration, the latch pin 124 will align with the latch opening 144 in the front leg 46. The latch spring 134 will fire the latch pin into the latch opening, engaging the fold latches 122 in the latched position of FIG. 4 and securing the frame assembly 22 in the unfolded configuration for use.

As discussed above, the configuration and construction of the drive mechanisms 90, as well as their location on the frame components, could change from the disclosed example and yet function as intended. Also, the drive mechanisms can be reconfigured so that the foldable stroller 20 unfolds automatically or both folds and unfolds automatically. In one example, the legs 96 and 98 of the torsion spring 92 could be configured to contact an underside of the drive link and a rear facing side of the rear leg, respectively. The spring 92 could also be configured so that the legs apply a biasing force toward one another, opposite from the disclosed example. This would configure the disclosed frame assembly 22 so that it unfolds automatically but would require manually folding up the frame assembly.

Other modifications to the disclosed foldable stroller 20 are within the spirit and scope of the present invention as well. The exposed surfaces 150 on the push arms 36 can be provided with caps that define resting surfaces. This could improve the upright resting stability of the folded up stroller 20. The front ends 78 of the drive links 76 could be configured to rest on the ground in the folded configuration, instead of, or in addition to, the exposed surfaces 150. The frame structure of the frame assembly 22 generally forms an "A" shape when viewed from the side. The angle between the drive link or fold link and the rear leg is acute or less then 90 degrees in the unfolded configuration and greater than 90 degrees in the folded configuration. The angular relationships between these and other frame components could also be varied from the disclosed example.

If desired, the length of the drive links can be such that it adjusts from a longer length in the set-up or in-use configuration to a shorter length in the folded configuration. This can allow for the length of the drive links and rear legs (between the drive link pivot and the fold joint) when unfolded to be greater than the combined length when folded. This may further allow a folded height to be defined by the length of either the push arms or the front legs (i.e., the longer of the front legs or the push arms, which would define the majority of the height of the folded stroller frame assembly).

In one example, the drive mechanism could be removed and the frame assembly could be completely manually foldable and unfoldable. Such a foldable stroller would still have the very compact folded cube size and be capable of standing upright during and when folded. The stroller frame assembly can be a manually foldable stroller frame assembly whereby the user can actuate the release actuator on the handle bar and then manually push the handle assembly toward the front legs. This would draw the rear wheels toward the front wheels. This would still retain the stroller frame assembly in an upright configuration that, when folding is complete (see FIGS. 8 and 9), will remain in a standing configuration. The user will then not need to bend over to reach and pick up the folded stroller frame assembly. Instead, the stroller frame assembly will already be accessible at about waist height and the caregiver's hand will have retained a hold on the handlebar or stroller frame assembly. This configuration will thus make it easier for a caregiver to fold, access, and manipulate the stroller frame assembly, even while one of their arms is occupied holding the child, even without the automatic folding or unfolding.

In another example, the disclosed stroller frame assembly can be configured and arranged in such a manner that it can fold up automatically, unfold automatically, or both. Each of the drive links can be associated with a drive or biasing mechanism or element, such as a spring-type mechanism. Such a biasing or drive mechanism can be designed to be pre-loaded with the stroller in one configuration or the other, i.e. folded or unfolded, regardless of the type of biasing element used.

In another example, torsion springs or other biasing elements or drive mechanisms can be utilized and arranged to bias or drive the rear legs and drive links toward one another in the unfolded or in-use configuration. In such a configuration, when the stroller frame assembly is in the folded configuration of FIGS. 8 and 9, the user can release a storage latch, as mentioned above. The torsion springs or biasing mechanisms can then automatically unfold the stroller frame assembly to the unfolded or in-use configuration (see reverse order of FIGS. 6-8). The mechanism would do so by forcing the push arms upward and away from the front legs until the fold joints and latch mechanisms engage. In order to fold such a stroller frame assembly, the user would have to actuate the release mechanism on the handlebar and then manually push the handle assembly and push arms downward toward the front leg, against the spring bias. A storage latch can be actuated manually or automatically when the stroller frame assembly reaches the folded configuration to retain the frame in the folded configuration.

In any configuration disclosed herein, the drive mechanisms could be provided directly between the push arms and fold joints or slide collars to forcibly slide the push arms. As will be evident to those having ordinary skill in the art, the torsion springs described herein can be replaced by other biasing or drive mechanisms, if desired. Conventional tension or compression coil springs can be utilized to act as the drive or biasing mechanism to automatically fold or unfold stroller frame assembly. Alternatively, other types of biasing or drive mechanisms can be utilized. Bungee cords or other highly elastic and strong cords can be connected between the handle bar of the handle assembly and the fold joints. These cords or tension elements can be run through the tubes of the handle assembly so that they are not seen or accessible. However, the tension in the cords can be utilized to fold or unfold the stroller frame assembly as described previously.

As will also become apparent to those having ordinary skill in the art upon reading this disclosure, the biasing or drive mechanisms can also be provided as a part of the fold joints, the rear drive link pivots on the rear legs, or the front drive link pivots at the lower ends of the push arms. Other configurations and constructions of the stroller frame assembly can also be utilized along with a biasing or drive mechanism that automatically folds or unfolds the stroller frame assembly, though the biasing or drive mechanisms can be connected to different portions of the stroller frame assembly than those disclosed or described herein.

Though not described in detail herein, it is also conceivable that biasing or drive mechanisms and fold joints for a stroller frame assembly, such as the stroller frame assembly disclosed and described herein, can be configured to both fold and unfold the stroller frame assembly automatically. In such an example, one drive mechanism (or one per frame side) could be configured to perform both folding and unfolding functions. Alternatively, two separate drive mechanisms (or two per frame side) could be utilized, one for each function. In either case, the spring force direction would have to be reversed when folding or unfolding is completed or the springs for one function would have to be deactivated mechanically when the springs for the other function are working to fold or unfold.

By integrating a "foot" into the pivot at the lower end of the telescoping push arm and drive link, the stroller frame assembly can be configured to have a stable base on which to stand when folded. These "feet" in combination with the front wheels can then allow the stroller to compactly fold while standing up and also to stand up while in the folded configuration. The rear wheels pivot up off the ground with the movement of the rear legs and drive links relative to the push arms.

The disclosed stroller frame assembly employs a specific fold geometry that allows the frame to be folded more compactly than other known strollers. This geometry can be utilized with or without the automatic fold and/or unfold features described above.

The use of springs, such as torsion springs, provides one purely mechanical mechanism to automatically fold and/or unfold the stroller frame assembly. The springs can be pre-loaded in one direction or the other and act to either fold or unfold the frame when released from the relevant configuration. The springs can be provided at either pivoting end of the drive link or at the fold joint. The springs or tension elements can also be provided extending from the handle bar or the push arms to the fold joints. Electromechanical means could also be used, in conjunction with the frame geometry disclosed and described herein. However, the purely mechanical drive mechanism solution is clean, durable, and of low component complexity.

Although certain foldable strollers, frame assemblies, and stroller components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A foldable stroller having a frame assembly movable between a folded configuration and an unfolded configuration, the frame assembly comprising:
   a fold joint;
   a fold latch actuable from a latched condition retaining the frame assembly in the unfolded configuration to a released condition;

a plurality of frame components coupled to the fold joint including a drive link connected to at least two other of the plurality of frame components; and a drive mechanism operably coupled to the frame assembly and configured and arranged to automatically fold the frame assembly from the unfolded configuration to the folded configuration when the fold latch is actuated to the released condition, wherein the fold latch includes
- a latch pin extending perpendicular to and through one of the frame components and having an exposed latching end,
- a hole through a shaft of the latch pin,
- a latch cable extending along an interior of the one frame component and through the hole, the latch cable having a free end fixed to the one frame component adjacent the latch pin,
- an adjacent frame component having a latch opening therein, the latching end of the latch pin extending into the latch opening in the latched position, and
- a latch spring captured between an inner surface of the one frame component and the latch cable at the hole and biasing the latch pin to the latched position, wherein tension applied to the latch cable compresses the latch spring and moves the latch pin to the released position with the latching end withdrawn from the latch opening.

2. A foldable stroller according to claim 1, wherein the frame assembly has left and right frame sides and each frame side has one of the fold joints, the plurality of the frame components and one of the drive links, and one of the drive mechanisms.

3. A foldable stroller according to claim 2, wherein the left and right frame sides are the same distance apart from one another in the folded configuration and in the unfolded configuration.

4. A foldable stroller according to claim 1, wherein the plurality of frame components includes a front leg and a handle push arm, and wherein a front end of the drive link is pivotally connected to a lower end of the handle push arm and each moves downward toward a lower end of the front leg when the frame assembly is moved to the folded configuration.

5. A foldable stroller according to claim 4, wherein the handle push arm slides parallel to the front leg when the frame assembly is moved to the folded configuration.

6. A foldable stroller according to claim 1, wherein the plurality of frame components includes a rear leg that is generally upright and extends down from the fold joint in the unfolded configuration and remains generally upright as the frame assembly is moved to the folded configuration, and wherein the foldable stroller stands upright in the folded configuration.

7. A foldable stroller according to claim 6, wherein the plurality of frame components includes a handle push arm and a front leg that slide parallel to one another as the frame assembly is moved between the folded and unfolded configurations, and wherein the foldable stroller stands upright on a front wheel assembly positioned at a lower end of the front leg and on either a lower end of the handle push arm, a front end of the drive link, or a contact surface defined thereat in the folded configuration.

8. A foldable stroller according to claim 1, wherein the plurality of frame components includes a from leg, a push arm and a slide collar, wherein the slide collar is connected to both the push arm and the front leg.

9. A foldable stroller according to claim 8, wherein the slide collar has two openings, one for receiving the front leg and one for receiving the push arm, and is affixed to the front leg.

10. A foldable stroller according to claim 1, wherein the drive mechanism is connected to a pivot joint between the drive link and one of the frame components.

11. A foldable stroller according to claim 1, wherein the drive mechanism has a pre-loaded resilient biasing element.

12. A foldable stroller according to clam 1, wherein the drive mechanism has a torsion spring.

13. A foldable stroller according to claim 1, wherein the drive mechanism has a torsion spring acting on a rear end of the drive link and a rear leg of the frame assembly.

14. A foldable stroller according to claim 1, wherein the drive mechanism is connected to a pivot joint between a rear end of the drive link and a rear leg of the plurality of frame components.

15. A foldable stroller according to claim 1, wherein the latch pin has a head which acts as a stop for the latch pin in the latched position.

16. A foldable stroller according to claim 1, wherein the drive link is pivotally connected to a rear leg.

17. A foldable stroller according to claim 1, wherein the drive link is pivotally connected to a push arm.

18. A foldable stroller according to claim 1, wherein the fold latch is provided at a lower end of a push arm.

19. A foldable stroller according to claim 1, wherein the drive link is generally linear in at least a front to rear direction relative to the frame assembly.

20. A foldable stroller according to claim 1, wherein the drive link is a hollow tubular structure.

* * * * *

UNITED STATES PATENT AND TRADEMARK OFFICE
CERTIFICATE OF CORRECTION

| | | |
|---|---|---|
| PATENT NO. | : 8,919,806 B2 | Page 1 of 1 |
| APPLICATION NO. | : 13/627592 | |
| DATED | : December 30, 2014 | |
| INVENTOR(S) | : Thomas J. Pollack et al. | |

It is certified that error appears in the above-identified patent and that said Letters Patent is hereby corrected as shown below:

In the claims:

Column 14
claim 8, line 14, please delete "from" and replace with --front--.

Signed and Sealed this
Fourteenth Day of April, 2015

Michelle K. Lee
*Director of the United States Patent and Trademark Office*